Oct. 26, 1937.  W. A. RAY ET AL  2,096,763
SOLENOID CONSTRUCTION
Filed Oct. 3, 1932

INVENTORS.
William A. Ray,
Charles R. Ray.
BY Townsend & Loftus
ATTORNEYS.

Patented Oct. 26, 1937

2,096,763

UNITED STATES PATENT OFFICE 2,096,763

SOLENOID CONSTRUCTION

William A. Ray and Charles R. Ray, San Francisco, Calif., assignors to General Controls Co., a corporation of California

REISSUED

Application October 3, 1932, Serial No. 635,886

6 Claims. (Cl. 175—341)

This invention relates to a solenoid construction and especially to a solenoid which operates quietly upon alternating current. The solenoid of this invention will be discussed in conjunction with its use as a valve operator, although it can obviously be used as an operator for various units.

Valves adapted to be actuated by an electromagnet are common, particularly where direct current or rectified alternating current is available. Valves of this character have also been operated with alternating current but they are not satisfactory where substantially silent operation is desired due to the continual hum set up by the alternating current. Also, valves of this character will often stick in open position after the current is turned off due to residual magnetism and, as such, can not be depended upon where positive opening and closing of a valve is required.

The object of the present invention is to generally improve and simplify the construction and operation of electromagnetically actuated valves; to provide a valve of this character which is adapted to be operated on alternating current and in which alternating current hum is entirely eliminated; and further, to provide an electromagnetically actuated valve which is dependable in operation, that is, a valve which will positively open when a circuit is made and positively close when a circuit through the valve is broken.

The electromagnetically actuated valve is shown by way of illustration in the accompanying drawing, in which—

Figure 1:
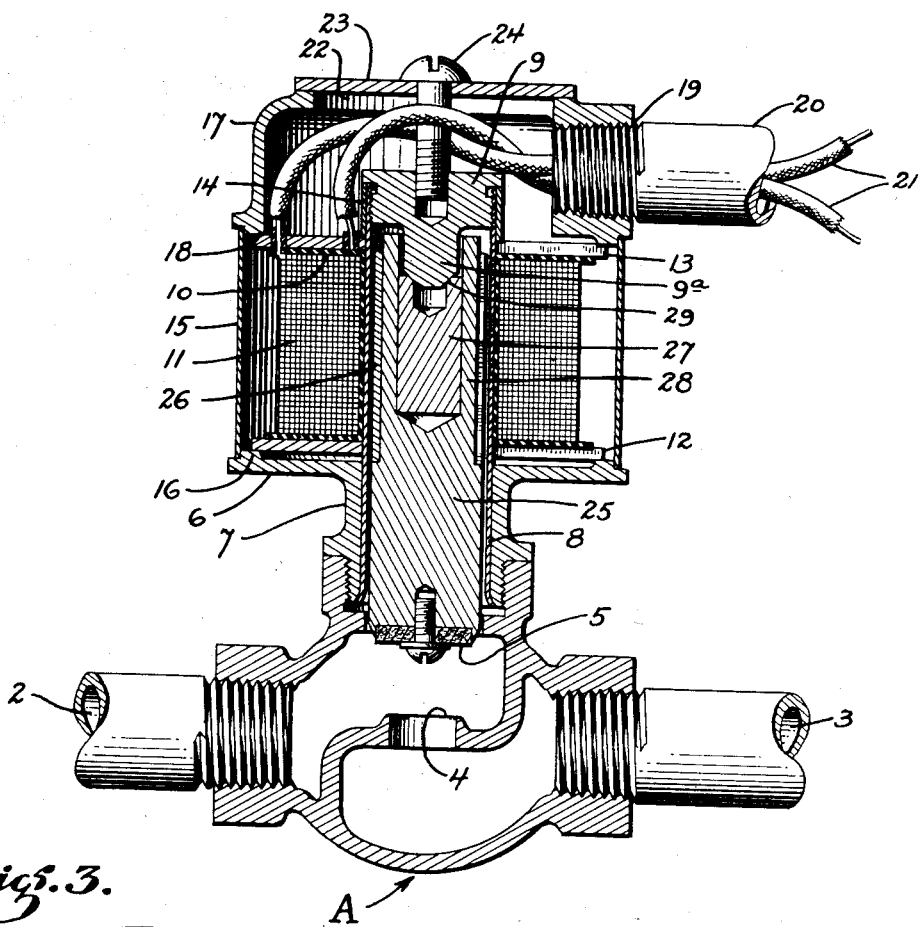
Fig. 1 is a central vertical section through the valve.

Referring to the drawing in detail and particularly Fig. 1, A indicates a valve housing provided with an inlet connection 2 and a discharge connection 3. Formed within the valve housing and intermediate the inlet and outlet connections is a valve seat 4 and movable with relation to said seat to open or close the valve is a valve member 5.

The movable valve member is, in this instance, actuated by an electromagnet of the solenoid type. The mechanism consists of a base member 6 provided with an extension 7 which is adapted to be screwed into or otherwise secured with relation to the upper end of the valve housing A. Extending through the extension 7 and soldered or otherwise secured therein is a tube 8. This tube is made of a non-magnetic material, such as brass, Monel, or the like, and the upper end is threaded to receive and secure a head member 9 constructed of a magnetic material. Mounted exterior of the tube 8 is a spool 10 of non-magnetic material on which is wound a coil 11. Secured at opposite ends of said spool are iron washers 12 and 13 which are held in place by a sleeve 14 and the head member 9 which acts as a clamping member.

The magnet as a whole is enclosed by a steel tube 15 which is centered and held in position by an annular shoulder 16 on the base member 6. A cap or upper housing member 17 engages the upper end of the tube 15 and this is also centered by an annular shoulder 18. An outlet connection 19 for the reception of a conduit pipe 20 and wires 21 is formed in the cap 17. A handhold 22 is also formed therein and a cover plate 23 normally forms a closure therefor. A screw 24 passes through the cover plate 23 and has threaded engagement with the head member 9. This screw functions as a clamping member as it pulls the cover plate and the housing section 17 downwardly on the tube 15 and as such secures it rigidly with relation to the base member 6. The wires 21 are connected with the terminals of the coil 11 and any suitable means may be employed for making or breaking the circuit therethrough.

Figure 3:
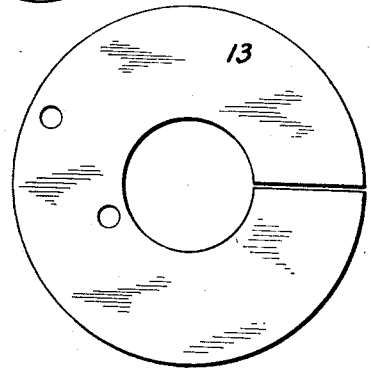
Fig. 3 is a plan view of one of the washers employed in conjunction with the electromagnet.
Figure 2:
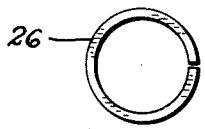
Fig. 2 is a cross section of the main core.

The movable valve member is, in the present instance, secured to a plunger generally indicated at 25. This plunger is preferably made of a non-magnetic material such as brass. In the present instance it is made of an aluminum alloy so as to decrease weight to a minimum. The plunger carries two core members which are secured thereto, a main core member indicated at 26 and a central or concentric secondary core member indicated at 27. Both core members are made of iron or steel, the main core member being split throughout its length, as shown in Fig. 2, and so are the washers 12 and 13 as shown in Fig. 3, the splitting of the same being of importance as it reduces short circuited turn losses.

The upper end of the plunger forms a shading coil indicated at 28. The shading coil is not split as phase displacement of the flux flowing through the central or secondary core is desired with relation to the flow of flux through the main core, as will hereinafter be described. The upper end of the secondary core member 27 is provided with an annular seat 29 and this is adapted to engage an extension 9a on the head member 9. The seat formed between the two members is made as accurate as possible, for instance by grinding or otherwise, so as to insure as perfect a seat and contact as possible as any imperfection in seating would cause vibration at this point and that is one of the features that can not be tolerated.

The valve shown in the present instance is intended for operation where alternating current is employed. It has previously been stated that electromagnetic valves have been employed on alternating current circuits but that the hum or noise produced has rendered them unsuitable for many installations. Where valves of this character are used commercially, for instance power plants, factories, and the like, hum is of no material importance, but where a valve of this character is installed in conjunction with a heating furnace, for instance to control the gas flow to a furnace in a private home, hum can not be tolerated as it is transmitted through the pipes to different rooms in the house and the noise becomes very annoying. The valve shown in the present instance has been particularly constructed to avoid this hum and also to avoid sticking of the valve in open position.

In actual operation it will be understood that the current flow through the coil 11 reaches a maximum flow at the peak of the sine wave and a minimum or a zero flow at the end of each half cycle. Actually there is a large flow of current in one direction for a fraction of a second and then this is followed by no flow at the period when the half cycle changes or the current reverses. Under such conditions it is obvious that the plunger 25, which is held in elevated position by the magnetic pull, will remain in full elevated position when the current is flowing and that it will have a tendency to drop once during each half cycle when there is no current flowing and no magnetic flux produced. The period of non-flow is, of course, so short that the plunger will not actually drop but it does release the grip or pull of the plunger for a fraction of a second and, as such, sets up a vibration which is very undesirable due to the noise transmitted through pipe and conduit connections. This hum or noise, as previously stated, is overcome in the present instance and will now be described.

When the coil 11 is energized the main magnetic circuit or flux flow will pass through the washers 12 and 13, the main core member 25 and the outer tube 15. The upper end of the plunger indicated at 28 functions as a shading coil. It is partially in the path of the main flux flow in the core member 26 and a secondary current is accordingly induced in the shading coil. This current affects a phase displacement and at the same time energizes the inner core 27, thus causing it to hold or retain the plunger in open position while the main core member 26 releases, or vice versa. The secondary core member becomes deenergized when the main core member 26 becomes energized, hence one or the other is constantly holding the plunger, together with the valve 5, in open position and vibration is accordingly entirely eliminated. Furthermore, the amount of iron in member 27 is so small that any residual magnetism left after breaking of the circuit through the wires 21 can under no circumstances cause the plunger to stick in elevated or open position, hence the moment the circuit through the wire 21 is broken plunger 25 will drop and valve 5 will positively close, thus insuring positive operation which is of great importance particularly where the valve is employed to control the fuel flow to a furnace or the like.

While certain features of the present invention are more or less specifically described, we wish it understood that various changes may be resorted to within the scope of the appended claims. Similarly, that the materials and finish of the several parts employed may be such as the manufacturer may decide, or varying conditions or uses may demand.

Having thus described our invention, what we claim and desire to secure by Letters Patent is—

1. In a device of the character described, a coil, magnetic members positioned at each end of said coil, a plunger, said coil and said members having a passage therethrough for said plunger, a stop member of magnetic material, means positioning said stop in a fixed position with an end thereof projecting into said passage beyond one of said magnetic members, said plunger comprising a non-magnetic member, a magnetic insert engaging said projecting stop end upon movement of said plunger through said passage in one direction to stop said plunger, said non-magnetic member enclosing said insert substantially entirely at its side portion and end away from said stop member, and an outer magnetic sleeve substantially surrounding said non-magnetic member and of a length substantially sufficient when said stop member is engaged to bridge said magnetic members.

2. In a device of the character described, a coil, magnetic members positioned at each end of said coil, a plunger, said coil and said members having a passage therethrough for said plunger, a stop member of magnetic material, means positioning said stop in a fixed position with an end thereof projecting into said passage beyond one of said magnetic members, said plunger comprising a non-magnetic member, a magnetic insert engaging said projecting stop end upon movement of said plunger through said passage in one direction to stop said plunger, said non-magnetic member enclosing said insert substantially entirely at its side portion and end away from said stop member, said non-magnetic member extending beyond said projecting end of said stop member when said stop member and said insert are engaged, and an outer magnetic sleeve substantially surrounding said non-magnetic member and of a length substantially sufficient when said stop member is engaged to bridge said magnetic members.

3. In a device of the character described, a coil having a passage therethrough, a stop member of magnetic material fixed in position adjacent one end of said passage, a plunger movable axially through said passage upon electrical energization of said coil to engage said stop member, said plunger comprising a non-magnetic member, a magnetic insert substantially enclosed by said non-magnetic member at its side portion and at the end away from said stop member, and an outer magnetic sleeve substantially surrounding said non-magnetic member, said non-magnetic member, insert, and magnetic sleeve being fixed together as a unit movable as a plunger to engage said insert with said stop member.

4. In a device of the character described, a coil having a passage therethrough, a magnetic member at each end of said coil, a stop member of magnetic material fixed in position adjacent one end of said passage, a plunger movable axially through said passage upon electrical energization of said coil to engage said stop member, said plunger comprising a non-magnetic member, a magnetic insert substantially enclosed by said non-magnetic member at its side portion and at the end away from said stop member, and an outer magnetic sleeve substantially surrounding said non-magnetic member, said sleeve being of a length substantially sufficient to bridge the distance between the magnetic members at the coil ends in one plunger position, said non-magnetic member, insert, and magnetic sleeve being fixed together as a unit movable as a plunger to engage said insert with said stop member.

5. In a device of the character described, a coil having a passage therethrough, a stop member of magnetic material fixed in position adjacent one end of said passage and extending into said passage, a plunger movable axially through said passage upon electrical energization of said coil to engage said stop member, said plunger comprising a non-magnetic member, a magnetic insert substantially enclosed by said non-magnetic member at its side portion and at the end away from said stop member and recessed at the end adjacent said stop member to receive said stop member below the top of said recessed end, and an outer magnetic sleeve substantially surrounding said non-magnetic member, said non-magnetic member, insert, and magnetic sleeve being fixed together as a unit movable as a plunger to engage said insert with said stop member.

6. In a device of the character described, a coil having a passage therethrough, a magnetic member at each end of said coil, a stop member of magnetic material fixed in position adjacent one end of said passage and extending into said passage, a plunger movable axially through said passage upon electrical energization of said coil to engage said stop member, said plunger comprising a non-magnetic member, a magnetic insert substantially enclosed by said non-magnetic member at its side portion and at the end away from said stop member and recessed at the end adjacent said stop member to receive said stop member below the top of said recessed end, and an outer magnetic sleeve substantially surrounding said non-magnetic member, said sleeve being of a length substantially sufficient to bridge the distance between the magnetic members at the coil ends in one plunger position, said non-magnetic member, insert, and magnetic sleeve being fixed together as a unit movable as a plunger to engage said insert with said stop member.

WILLIAM A. RAY.
CHARLES R. RAY.